(12) United States Patent
Chowdhury et al.

(10) Patent No.: US 11,340,479 B2
(45) Date of Patent: May 24, 2022

(54) ELASTOMERIC OPTICAL DEVICE AND RELATED OPERATION METHODS

(71) Applicant: Cardinal CG Company, Eden Prairie, MN (US)

(72) Inventors: Reaz Ahmed Chowdhury, Cross Plains, WI (US); Luis Octavio Arellano, Muscoda, WI (US); Keith James Burrows, Mineral Point, WI (US)

(73) Assignee: CARDINAL CG COMPANY, Eden Prairie, MN (US)

( * ) Notice: Subject to any disclaimer, the term of this patent is extended or adjusted under 35 U.S.C. 154(b) by 250 days.

(21) Appl. No.: 16/864,837

(22) Filed: May 1, 2020

(65) Prior Publication Data
US 2020/0257141 A1   Aug. 13, 2020

Related U.S. Application Data

(63) Continuation-in-part of application No. 15/982,677, filed on May 17, 2018, now Pat. No. 10,775,649.

(51) Int. Cl.
*G02B 26/00* (2006.01)
*G02F 1/01* (2006.01)
(Continued)

(52) U.S. Cl.
CPC .......... *G02F 1/0131* (2013.01); *E06B 3/6722* (2013.01); *E06B 9/24* (2013.01); *E06B 2009/247* (2013.01); *E06B 2009/2417* (2013.01)

(58) Field of Classification Search
CPC ........ G02F 1/0131; E06B 3/6722; E06B 9/24; E06B 2009/2417; E06B 2009/247
(Continued)

(56) References Cited

U.S. PATENT DOCUMENTS

| 4,893,908 A | 1/1990 | Wolf et al. |
| 5,042,923 A | 8/1991 | Wolf et al. |

(Continued)

FOREIGN PATENT DOCUMENTS

CN   107357053 A   11/2017

OTHER PUBLICATIONS

Cao et al., "Harnessing Localized Ridges for High-Aspect-Ratio Hierarchical Patterns with Dynamic Tunability and Multifunctionality," Advanced Materials, Mar. 2014, vol. 26, No. 11, 16 pages.
(Continued)

*Primary Examiner* — William Choi
(74) *Attorney, Agent, or Firm* — Fredrikson & Byron, P.A.

(57) ABSTRACT

The invention provides an elastomeric optical device having a first optical state and a second optical state. The device is transparent when in the first optical state and translucent or opaque when in the second optical state. The device comprises, in sequence, a first transparent electrode, a dielectric layer, an elastomer layer, and a second transparent electrode. The elastomer layer preferably has certain mechanical properties, such as a Shore OOO hardness of less than 15, and/or certain chemical properties, such as being substantially devoid of unreacted sites. The second transparent electrode is configured to compress the elastomer layer in response to an electric field between the first and second transparent electrodes, such that when the elastomeric optical device is in the second optical state, the elastomer layer is compressed between the first and second transparent electrodes. Methods of operating an elastomeric optical device are also provided.

51 Claims, 5 Drawing Sheets

(51) Int. Cl.
  *E06B 9/24* (2006.01)
  *E06B 3/67* (2006.01)
(58) Field of Classification Search
  USPC ........................................................ 359/295
  See application file for complete search history.

(56) References Cited

U.S. PATENT DOCUMENTS

| | | | |
|---|---|---|---|
| 5,111,327 A | 5/1992 | Blohm et al. |
| 5,186,860 A | 2/1993 | Joyce, Jr. et al. |
| 5,187,608 A | 2/1993 | Blohm et al. |
| 5,253,100 A | 10/1993 | Yang et al. |
| 6,452,711 B1 | 9/2002 | Heuer et al. |
| 6,461,541 B1 | 10/2002 | Lee et al. |
| 6,605,391 B2 | 8/2003 | Chen et al. |
| 6,747,780 B2 | 6/2004 | Xu et al. |
| 6,791,738 B2 | 9/2004 | Reynolds et al. |
| 7,002,722 B2 | 2/2006 | Xu et al. |
| 7,038,828 B2 | 5/2006 | Xu et al. |
| 7,256,923 B2 | 8/2007 | Liu et al. |
| 7,339,728 B2 | 3/2008 | Hartig |
| 7,342,708 B2 | 3/2008 | Ho et al. |
| 7,342,716 B2 | 3/2008 | Hartig |
| 7,354,531 B2 | 4/2008 | Boon et al. |
| 7,450,290 B2 | 11/2008 | Xu et al. |
| 7,572,509 B2 | 8/2009 | Hartig |
| 7,572,510 B2 | 8/2009 | Hartig |
| 7,572,511 B2 | 8/2009 | Hartig |
| 7,764,416 B2 | 7/2010 | Wu et al. |
| 7,833,592 B2 | 11/2010 | Pilloy |
| 7,867,616 B2 | 1/2011 | Harutyunyan |
| 7,884,994 B2 | 2/2011 | Piroux |
| 7,906,203 B2 | 3/2011 | Hartig |
| 7,940,447 B2 | 5/2011 | Wu et al. |
| 8,049,949 B2 | 11/2011 | Schwendeman et al. |
| 8,179,587 B2 | 5/2012 | Weber et al. |
| 8,593,714 B2 | 11/2013 | Agrawal et al. |
| 8,749,009 B2 | 6/2014 | Young et al. |
| 8,995,039 B2 | 3/2015 | Bartug et al. |
| 9,185,798 B2 | 11/2015 | Young et al. |
| 9,207,515 B2 | 12/2015 | Chandrasekhar |
| 9,249,353 B2 | 2/2016 | Posset et al. |
| 9,274,395 B2 | 3/2016 | Chandrasekhar |
| 9,302,452 B2 | 4/2016 | Uprety et al. |
| 9,341,913 B2 | 5/2016 | Milliron et al. |
| 9,377,662 B2 | 6/2016 | Lee et al. |
| 9,594,284 B2 | 3/2017 | Chandrasekhar |
| 9,720,299 B1 | 8/2017 | Timmerman et al. |
| 9,766,528 B2 | 9/2017 | Kloeppner et al. |
| 9,785,031 B2 | 10/2017 | Mattox et al. |
| 9,791,760 B2 | 10/2017 | Garcia et al. |
| 9,862,640 B2 | 1/2018 | Pfaff et al. |
| 10,775,649 B2 | 9/2020 | Switzer |
| 2005/0248825 A1 | 11/2005 | Warren et al. |
| 2007/0082124 A1 | 4/2007 | Hartig |
| 2012/0234465 A1 | 9/2012 | Wen et al. |
| 2013/0016271 A1 | 1/2013 | Kwon et al. |
| 2013/0020113 A1 | 1/2013 | Corbea et al. |
| 2014/0175281 A1 | 6/2014 | Reynolds et al. |
| 2014/0183423 A1 | 7/2014 | Kim et al. |
| 2015/0070743 A1 | 3/2015 | Branda et al. |
| 2016/0011482 A1 | 1/2016 | Danine et al. |
| 2016/0242282 A1 | 8/2016 | Uprety et al. |
| 2016/0244625 A1 | 8/2016 | Clapp et al. |
| 2017/0097551 A1 | 4/2017 | Garcia et al. |
| 2017/0184936 A1 | 6/2017 | Chandrasekhar |
| 2017/0297058 A1 | 10/2017 | Jiang et al. |
| 2017/0299911 A1 | 10/2017 | Woo et al. |
| 2017/0329196 A1 | 11/2017 | Timmerman et al. |
| 2017/0357136 A1 | 12/2017 | Kloeppner et al. |
| 2018/0011359 A1 | 1/2018 | De Jong et al. |
| 2018/0050524 A1 | 2/2018 | Sun et al. |
| 2018/0246318 A1 | 8/2018 | Shian et al. |
| 2019/0041680 A1 | 2/2019 | Koshida |
| 2020/0185590 A1* | 6/2020 | Malhotra ............... B05D 3/108 |

OTHER PUBLICATIONS

Chung et al., "Solution-Processed Flexible Transparent Conductors Composed of Silver Nanowire Networks Embedded in Indium Tin Oxide Nanoparticle Matrices," Nano Research, 2012, 10 pages.

Dattoli et al., "ITO nanowires and nanoparticles for transparent films," Materials Research Society, vol. 36, Oct. 2011, pp. 782-788.

Ende et al., "Voltage-Controlled Surface Wrinkling of Elastomeric Coatings," Advanced Materials, Pre-Peer Reviewed Article, 2013, 13 pages.

Fallahian et al., "Preparation of Conductive, Flexible and Transparent Films by In Situ Deposition of Polypyrrole Manoparticles on Polyethylene Terephthalate," Polymer Science, Series B, Apr. 2017, 13 pages.

Heo et al., "Template-Free Mesoporous Electrochromic Films on Flexible Substrates from Tungsten Oxide Nanorods," Nano Letters, vol. 17, 2017, pp. 5756-5761.

Khondoker et al., "Flexible and conductive ITO electrode made on cellulose film by spin-coating," Synthetic Metals, vol. 162, 2012, pp. 1972-1976.

Lee et al., "Switchable Transparency and Wetting of Elastomeric Smart Windows," Advanced Materials, vol. 22, 2010, pp. 5013-5017.

Liu et al., "Highly Stretchable and Flexible Graphene/ITO Hybrid Transparent Electrode," Nanoscale Research Letters, vol. 11, No. 108, 2016, 7 pages.

Ong et al., "Microscopically Crumpled Indium-Tin-Oxide Thin Films as Compliant Electrodes with Tunable Transmittance," Applied Physics Letters, vol. 107, No. 13, Sep. 2015, 16 pages.

Sakamoto et al., "Highly flexible transparent electrodes based on mesh-patterned rigid indium tin oxide," Scientific Reports, vol. 8, No. 2825, 2018, 8 pages.

Shian et al., "Highly Compliant Transparent Electrodes," Applied Physics Letters, vol. 101, No. 6, 2012, 13 pages.

Shrestha et al., "Tunable window device based on micro-wrinkling of nanometric zinc-oxide thin film on elastomer," Optics Letters, vol. 41, No. 19, Oct. 2016, pp. 4433-4436.

Zang et al., "Multifunctionality and control of the crumpling and unfolding of large-area graphene," Nature Materials, vol. 12, Apr. 2013, pp. 321-325.

Duraisamy et al., "Deposition and characterization of silver nanowires embedded PEDOT:PSS thin films via electrohydrodynamic atomization," Chemical Engineering Journal, vol. 225, Jun. 2013, pp. 887-894.

International Patent Application No. PCT/US2019/030391, International Search Report and Written Opinion dated Aug. 8, 2019, 14 pages.

Ong et al., "Crumpled indium-tin-oxide electrodes for transparency tuning," Proceedings of the SPIE, vol. 9798, Apr. 15, 2016, 7 pages.

Preliminary Amendment with replacement drawings filed Aug. 15, 2019 in related U.S. Appl. No. 15/982,677, 18 pages.

Non-Final Office Action dated Mar. 17, 2020, in related U.S. Appl. No. 15/982,677, 12 pages.

Amendment and Response to Non-Final Office Action filed Jun. 3, 2020, in related U.S. Appl. No. 15/982,677, 15 pages.

Notice of Allowance dated Jul. 9, 2020 in related U.S. Appl. No. 15/982,677, 8 pages.

Corrected Notice of Allowance dated Aug. 13, 2020 in related U.S. Appl. No. 15/982,677, 5 pages.

Shrestha, M. et al., "Electrically tunable window based on microwrinkled ZnO/Ag thin film," Proceedings of SPIE, vol. 10163, Apr. 17, 2017, 7 pgs.

PCT International Search Report and Written Opinion dated Aug. 10, 2021 for related International Application No. PCT/US2021/029916, 10 pgs.

* cited by examiner

Fig. 3

ELASTOMERIC OPTICAL DEVICE AND RELATED OPERATION METHODS

RELATED APPLICATIONS

This application is a continuation-in-part of and claims priority to U.S. application Ser. No. 15/982,677, filed May 17, 2018, the contents of which are incorporated by reference herein.

FIELD OF THE INVENTION

The present invention relates generally to an elastomeric optical device. More particularly, this invention relates to an elastomeric optical device having an elastomer layer that is compressed between two transparent electrodes in response to establishing an electric field between the two transparent electrodes. The present invention also provides methods for operating such devices.

BACKGROUND OF THE INVENTION

Certain elastomeric optical devices are known. One such device has the following structure: glass substrate/indium tin oxide bottom electrode layer/acrylate-based elastomer layer/gold top electrode layer. When a sufficient voltage is applied between the top and bottom electrode layers, a change occurs in the optical properties of the device. For example, a voltage-induced wrinkling of the elastomer layer occurs. The wrinkling causes diffusion or scattering of light transmitted through the wrinkled elastomer/gold. A device of this nature is reported in van den Ende et al., *Voltage-Controlled Surface Wrinkling of Elastomeric Coatings*, Adv. Mater. 2013; 25: 3438-3442.

It would be desirable to provide an elastomeric optical device based on an elastomer layer having mechanical properties that facilitate its deformation when the device is actuated. It would be particularly desirable to provide such an elastomer layer that also has chemical properties facilitating longevity, stability, and electrical performance. It would be desirable to configure such a device so it transitions from clear to opaque or translucent in response to a modest voltage. Further, it would be desirable to provide an elastomeric optical device having a dielectric layer with mechanical properties that dovetail with the mechanical properties of the elastomer layer to facilitate proper functioning of the device. Still further, it would be desirable to provide methods of operating an elastomeric optical device, such as methods where the first transparent electrode serves as the cathode, methods where device recovery is particularly fast, or both.

SUMMARY OF THE INVENTION

In some embodiments, the invention provides an elastomeric optical device comprising, in sequence, a first transparent electrode, a dielectric layer, an elastomer layer, and a second transparent electrode. The dielectric layer has a greater stiffness than the elastomer layer. In the present embodiments, the elastomer layer has a Shore OOO hardness of less than 15 and an elastic modulus that is lower than 20 kPa. The second transparent electrode is configured to compress the elastomer layer in response to an electric field between the first and second transparent electrodes, such that when the elastomeric optical device is in the second optical state the elastomer layer is compressed between the first and second transparent electrodes. In addition, the ratio of the elastic modulus of the dielectric layer to the elastic modulus of the elastomer layer can optionally be at least 5,000:1, or even at least 100,000:1. The elastomer layer in the present embodiments can optionally comprise a silicone gel characterized by being substantially devoid of unreacted sites.

Certain embodiments of the invention provide an elastomeric optical device comprising, in sequence, a first transparent electrode, a dielectric layer, an elastomer layer, and a second transparent electrode. In the present embodiments, a ratio of the elastic modulus of the dielectric layer to the elastic modulus of the elastomer layer is at least 5,000:1. In the present embodiments, the elastomer layer and the dielectric layer each have a thickness in a range of from 1 to 10 microns. The second transparent electrode is configured to compress the elastomer layer in response to an electric field between the first and second transparent electrodes, such that when the elastomeric optical device is in the second optical state the elastomer layer is compressed between the first and second transparent electrodes. The elastomeric optical device transitions from the first optical state to the second optical state in response to an activation voltage, which in the present embodiments is preferably in a range of from 100 to 250 Volts. In addition, the elastomer layer can optionally have a Shore OOO hardness of less than 15 and an elastic modulus that is lower than 20 kPa. In such cases, the elastomer layer in the present embodiments can optionally comprise a silicone gel characterized by being substantially devoid of unreacted sites.

In some embodiments, the invention provides a method of operating an elastomeric optical device. The device comprises, in sequence, a first transparent electrode, a dielectric layer, an elastomer layer, and a second transparent electrode. The device has a first optical state and a second optical state; it is transparent when in the first optical state, and translucent or opaque when in the second optical state. In the present embodiments, the method comprises maintaining an electric field between the first and second transparent electrodes by providing an activation voltage across the first and second transparent electrodes and thereafter transitioning to providing a recovery voltage across the first and second transparent electrodes. The second transparent electrode compresses the elastomer layer in response to the activation voltage, such that when the activation voltage is provided the elastomeric optical device is in the second optical state due to the elastomer layer being compressed between the first and second transparent electrodes. In the present embodiments, the elastomeric optical device changes from the second optical state to the first optical state in response to such transitioning to the recovery voltage. In the present method, the activation voltage is in a range of from 40 to 350 Volts, and the recovery voltage preferably is a non-zero voltage that is lower than, and has the same polarity as, the activation voltage. In the present embodiments, the elastomer layer can optionally have a Shore OOO hardness of less than 15 and an elastic modulus that is lower than 20 kPa, and/or the ratio of the elastic modulus of the dielectric layer to the elastic modulus of the elastomer layer can optionally be at least 5,000:1, or even at least 100,000:1. The elastomer layer in the present embodiments can optionally comprise a silicone gel characterized by being substantially devoid of unreacted sites.

In the embodiments described in any of the three preceding paragraphs, the elastomeric optical device can optionally be configured such that at least certain portions of the second transparent electrode are closer to the first transparent electrode when the elastomeric optical device is in the second optical state than they are when the elastomeric optical device is in the first optical state. In such cases, the device preferably has a surface topography that is characterized by greater roughness when the device is in the second optical state than when it is in the first optical state. For example, the surface topography of the device when in the second optical state may be characterized by pits, wrinkles, or both. In some cases, the surface topography of the device when in the second optical state has 0.1 to 10 million pits/cm$^2$.

Furthermore, for any embodiment outlined in this summary section, the elastomer layer can optionally have a yield strength of less than 10 kPa, or even less than 5 kPa, e.g., in a range of 0.1 to 2.5 kPa, such as 1 to 2 kPa.

DETAILED DESCRIPTION OF PREFERRED EMBODIMENTS

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

Figure 1:
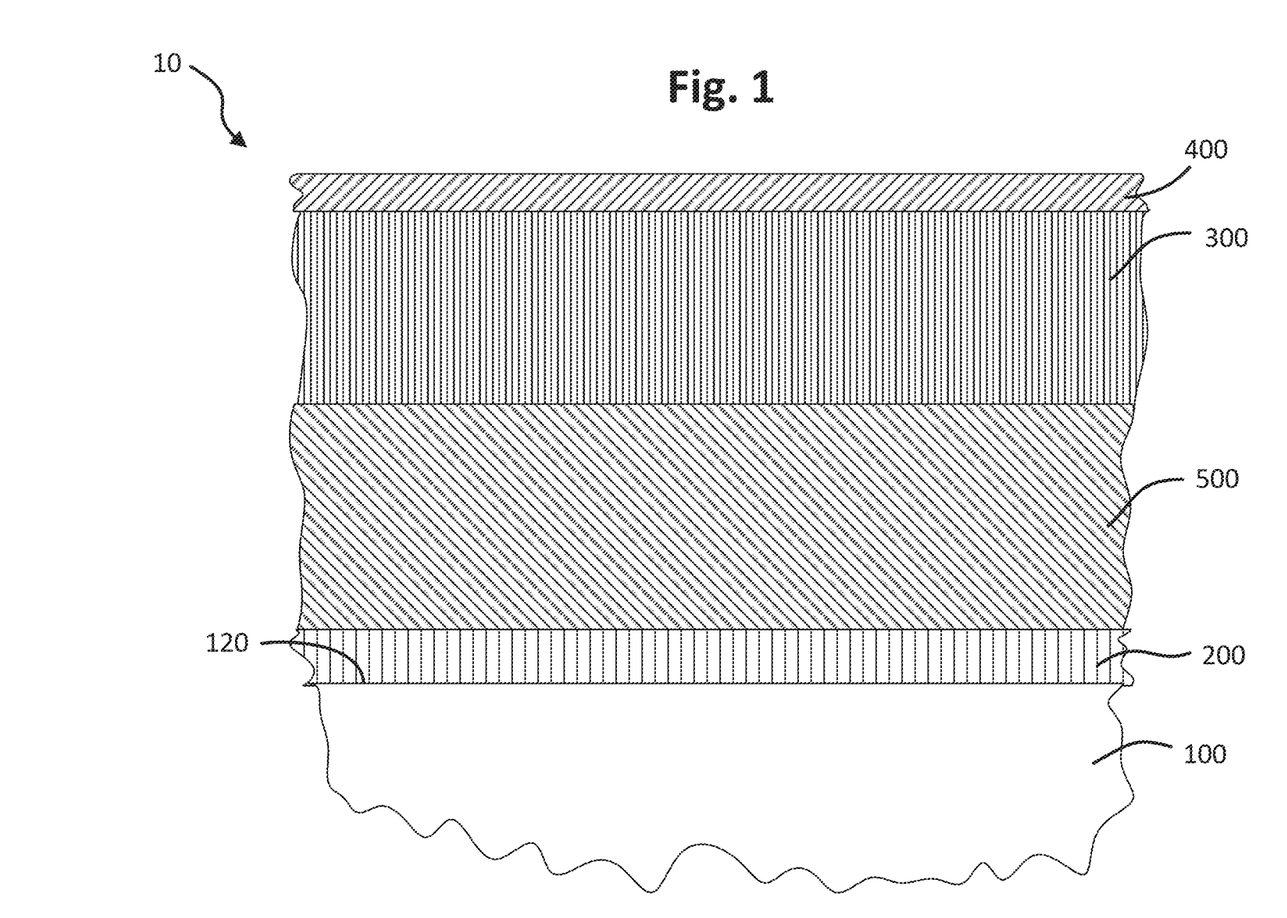
FIG. 1 is a schematic, broken-away cross-sectional view of an elastomeric optical device in accordance with certain embodiments of the present disclosure.

Referring to the drawings, and in particular, FIG. 1, there is shown an elastomeric optical device ("EOD") of the present disclosure generally represented by reference numeral 10. The EOD 10 has switchable optical properties. It is configured to provide deformation of an elastomer layer 300 in response to an electric field.

The EOD 10 has a first optical state and a second optical state. The EOD 10 is transparent when in the first optical state, and translucent or opaque when in the second optical state. The term "transparent," as used in the present disclosure, refers to a material that has a direct transmission of visible radiation of at least 50% and a diffuse transmission of visible radiation of less than 10%. "Translucent," as used herein, refers to a material that has a diffuse transmission of visible radiation of at least 50% and a direct transmission of visible radiation of less than 10%. "Opaque" is defined herein as having a direct (i.e., non-diffuse) visible transmission of less than 3%. Visible radiation or "light," as those terms are used herein, refer to electromagnetic energy in the range of 380 nm to 780 nm.

When the EOD 10 is in the first optical state, the elastomer layer 300 preferably is in a default (e.g., relaxed and/or non-compressed) state. The first optical state can optionally be a default (or "static," e.g., non-powered or less powered) state of the device. In some cases, when the EOD 10 is in the first optical state, there is no electric field (or at least substantially no electric field) between the two electrodes, and the elastomer layer is in a default state. In other cases, when the EOD 10 is in the first optical state, there is an electric field between the two electrodes, but the voltage is lower than the activation voltage, and the elastomer layer is in a default state. Thus, there may be an electric field between the two electrodes when the device is in the first optical state, but in such cases, that electric field is weaker or otherwise different than the electric field present when the device is in the second optical state. More generally, when an electric field is applied, it can be continuous (DC power) or it can involve AC power (e.g., sine wave or pulsed DC). For an AC signal, such field may alternate between two (or more) voltages (like 0 V and 3,000 V, or 1,000 V and 3,000 V), or the polarity of the field can be reversed.

The EOD 10 is switchable between the first optical state and the second optical state by providing, removing, or adjusting (e.g., increasing) a voltage to the EOD 10. This can be accomplished, for example, by activating or deactivating a switch. This allows the optical properties, and thus the visible appearance, of the EOD 10 to be selectively altered.

The EOD 10 of the present invention has various practical applications. For instance, it can be implemented into smart windows, thus allowing such a window to be used as a privacy glazing (e.g., for privacy glass). In such an example, the EOD 10 can provide a frosted or white opaque appearance when in the second optical state in order to provide a high level of privacy. In other embodiments, the EOD 10 can form part of a door, skylight, or other glazing. Further, the EOD 10 can be part of an internal partition, if so desired.

Many embodiments of the EOD 10 involve a substrate 100 (see FIGS. 1, 2, 4A, 4B, and 5). A wide variety of substrate types are suitable for use in the invention. Preferably, the substrate 100 is a sheet-like substrate having generally opposed first and second major surfaces. For example, the substrate 100 can be a sheet of transparent material (i.e., a transparent sheet), such as glass. Preferably, the substrate 100 is a glass sheet (e.g., a windowpane). A variety of known glass types can be used, such as soda-lime glass. In some cases, it may be desirable to use "white glass," a type of glass having low iron content. When substrate 100 is a glass sheet, it typically will not be capable of being wound. This can optionally be the case for any embodiment of the present disclosure.

Substrates of various sizes can be used in the present invention. Commonly, large-area substrates are used. Certain embodiments involve a substrate having a major dimension (e.g., a length or width) of at least about 0.5 meters, preferably at least about 1 meter, perhaps more preferably at least about 1.5 meters (e.g., between about 2 meters and about 4 meters), and in some cases at least about 3 meters. In some embodiments, the substrate 100 is a jumbo glass sheet having a length and/or width that is between about 3 meters and about 10 meters, e.g., a glass sheet having a width of about 3.5 meters and a length of about 6.5 meters. Substrates having a length and/or width of greater than about 10 meters are also anticipated.

Substrates of various thicknesses can be used in the present invention. In some embodiments, the substrate 100 (which can optionally be a glass sheet) has a thickness of 1-14 mm, such as 2-14 mm. Certain embodiments involve a substrate with a thickness of between about 2.3 mm and about 4.8 mm, and perhaps more preferably between about 2.5 mm and about 4.8 mm. In one embodiment, a sheet of glass (e.g., soda-lime glass) with a thickness of about 3 mm is used.

As discussed above, substrate 100 can be glass. If desired, the glass can be an extremely thin glass substrate of a composition that enables it to be flexible. In some cases, the substrate 100 is a transparent ceramic material or a transparent plastic material (e.g., a polymeric material). Suitable plastic film substrates include, but are not limited to, a Mylar sheet or film, polymethyl methacrylates, polycarbonates, polyurethanes, polyethylene terephthalate (PET), or any combinations thereof.

Figure 5:
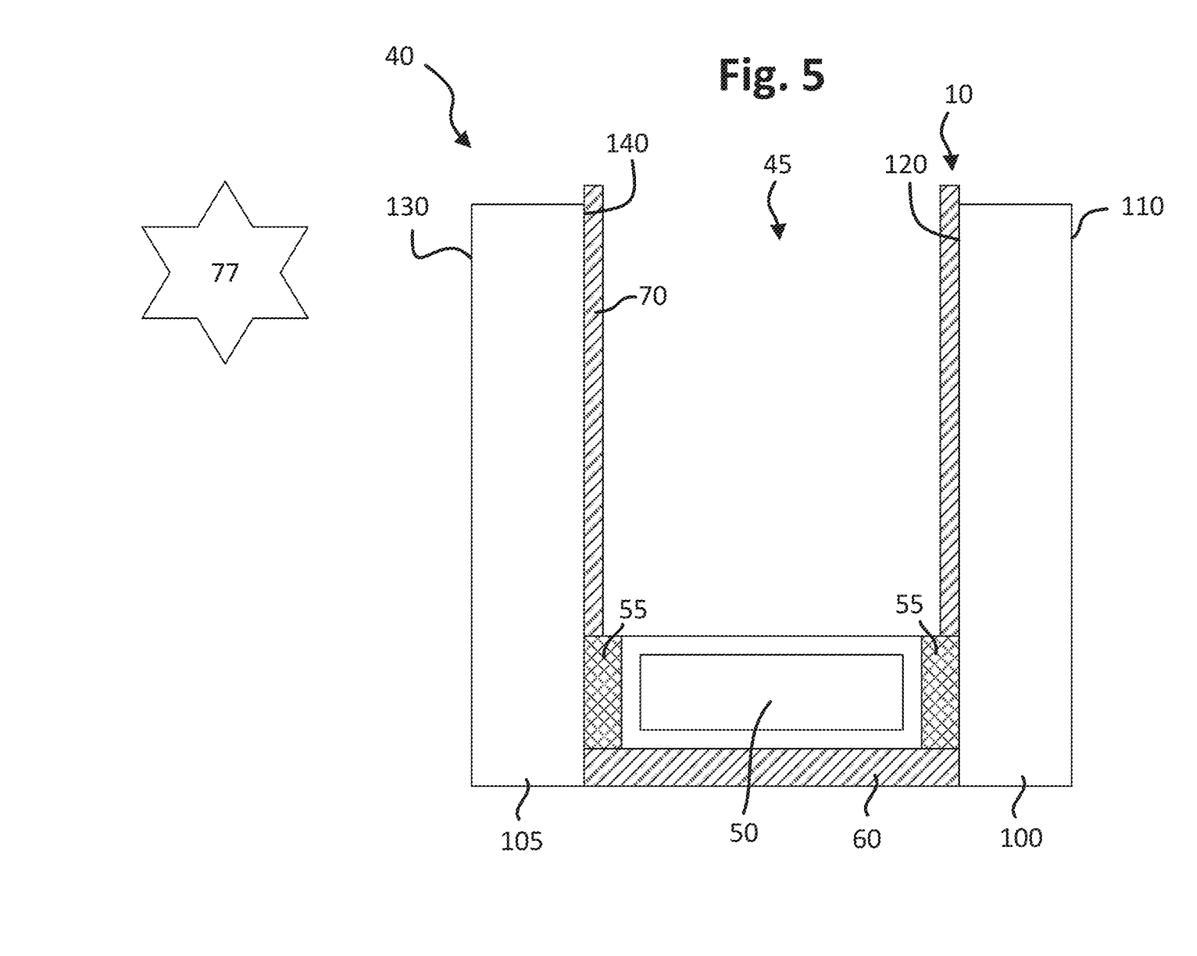
FIG. 5 is a partially broken-away schematic cross-sectional side view of a multiple-pane insulating glazing unit that includes an exterior pane defining a second surface having a low-emissivity coating and an interior pane defining a third surface that carries an elastomeric optical device in accordance with certain embodiments of the present disclosure.

Substrate 100 has opposed surfaces (or faces) 110 and 120, which preferably are major surfaces (as opposed to edge surfaces). In some cases, surface 120 is destined to be an internal surface exposed to a between-pane space of an insulating glazing unit, while surface 110 is destined to be an external surface exposed to an interior of a building (as shown in FIG. 5). This, however, need not be the case in all embodiments.

Figure 3:
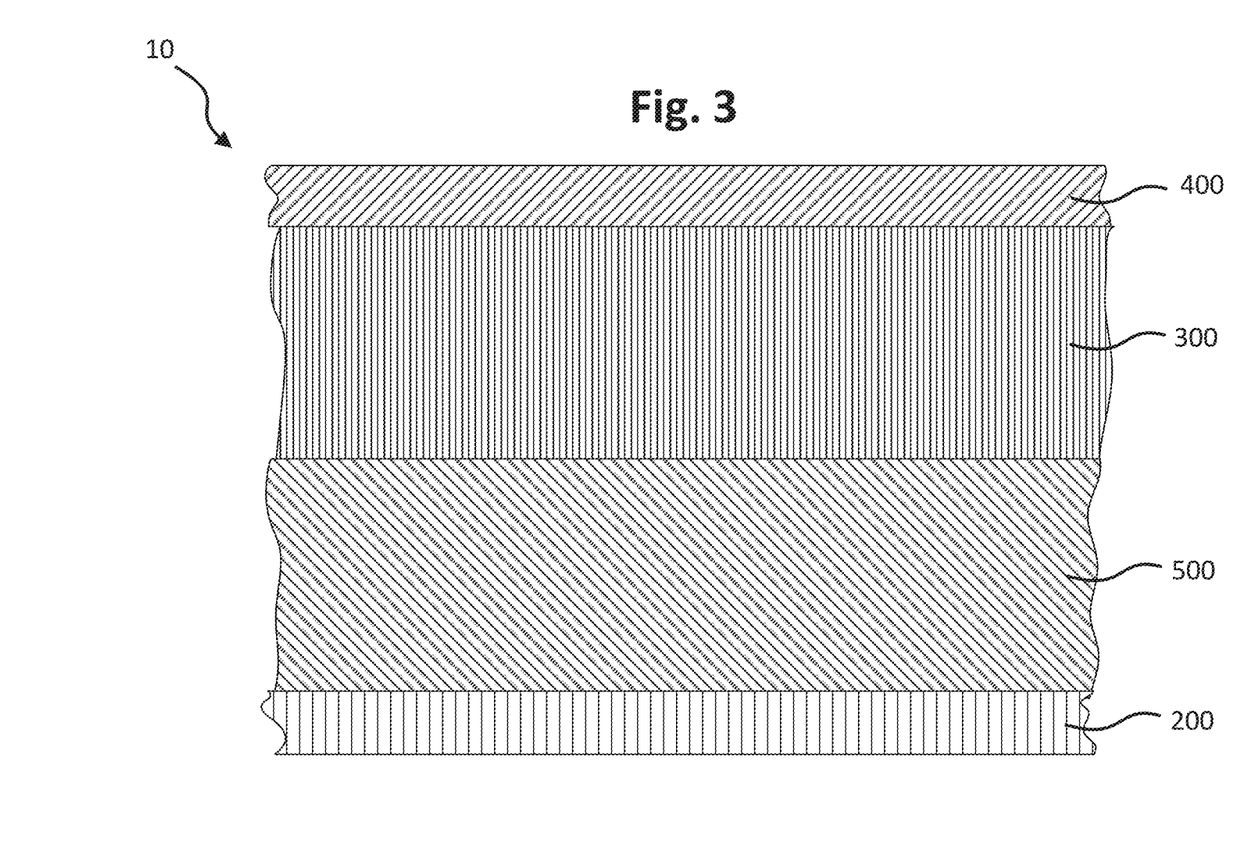
FIG. 3 is a schematic, broken-away cross-sectional view of an elastomeric optical device in accordance with still other embodiments of the present disclosure.

While embodiments that have a separate substrate have now been described, other embodiments of the EOD 10 do not have a separate substrate (see FIG. 3). In such cases, the EOD 10 preferably includes a self-supporting dielectric layer 500 (e.g., an extruded polymer sheet) that carries on one of its two opposed faces a first transparent electrode 200 while carrying on the other of its two opposed faces an elastomer layer 300 and a second transparent electrode 400.

Referring now to FIG. 1, the EOD 10 comprises, in sequence, a substrate 100, a first transparent electrode 200, a dielectric layer 500, an elastomer layer 300, and a second transparent electrode 400. In FIG. 1, the first transparent electrode 200 is in contact with the substrate 100, the dielectric layer 500 is in contact with the first transparent electrode 200, the elastomer layer 300 is in contact with the dielectric layer 500, and the second transparent electrode 400 is in contact with the elastomer layer 300. This, however, is not required. As just one example, substrate 100 can be a glass sheet, and a polymer sheet can be provided between the glass sheet and the first transparent electrode 200. In such cases, one of the two opposed faces of the polymer sheet can be adhered or laminated to the glass sheet while the other of the two faces of the polymer sheet carries the first transparent electrode, the dielectric layer, the elastomer layer, and the second transparent electrode. Thus, in embodiments where a glass pane supports the OED, the glass can support the OED directly or indirectly.

The first transparent electrode 200 is a bottom electrode of the EOD 10. In FIG. 1, the first transparent electrode 200 preferably is a film comprising a transparent electrically conductive oxide ("TCO"), optionally together with one or more other materials, such as fluorine, carbon nanotubes, or other components. The TCO film can comprise, for example, indium tin oxide ("ITO"), fluorinated tin oxide ("FTO"), a doped zinc oxide, such as aluminum-doped zinc oxide ("AZO"), a doped titanium dioxide, such as niobium-doped $TiO_2$ ("NTO"), or indium cerium oxide.

In some cases, the first transparent electrode 200 comprises an ITO film, such as a sputtered ITO film. This can optionally be the case, for example, in any embodiment discussed herein relative to any of FIGS. 1, 2, 4A, 4B, and 5. In such cases, the film can contain various relative percentages of indium and tin. For instance, such an ITO film preferably consists essentially of (e.g., contains more than 90% by weight), or consists of, indium tin oxide. In addition, for such an ITO film, indium preferably is the major constituent on a metal-only basis. That is, indium preferably accounts for more than 50% of the film's total metal weight. In some cases, the composition of such a film on a metal-only basis ranges from about 75% indium/25% tin to about 95% indium/5% tin, such as about 90% indium/ 10% tin.

In certain embodiments, the first transparent electrode 200 has a thickness in a range of from 70-200 nm. For example, the first transparent electrode 200 can optionally have a thickness in a range of from 90-150 nm, such as in a range of from 110-130 nm (e.g., about 120 nm). For any embodiment wherein the first transparent electrode 200 is a TCO-based coating, the thickness of the first transparent electrode can optionally be in any one or more of the ranges noted in this paragraph. All thicknesses recited herein are physical (not optical) thicknesses, unless indicated to the contrary.

When the first transparent electrode 200 comprises (e.g., is) a TCO film, the film can optionally be deposited on the substrate 100 by sputtering. Sputtering is a well-known thin film deposition technique. Conventional sputtering techniques can be used to deposit a suitable sputtered TCO film.

Another option is for the first transparent electrode 200 to comprise an electrically conductive polymer, transparent electrically conductive nanoparticles, or both. When the first transparent electrode 200 comprises (or consists of, or at least consists essentially of) an electrically conductive polymer, it preferably comprises PEDOT:PSS. In some cases, the first transparent electrode 200 comprises electrically conductive nanoparticles embedded in an electrically conductive polymer matrix. Preferred electrically conductive nanoparticles for the first transparent electrode 200 comprise ITO nanoparticles, although other electrically conductive nanoparticles can be used. In some cases, the first transparent electrode 200 comprises an electrically conductive polymer provided as an electrically conductive polymer layer positioned either over or under the electrically conductive nanoparticles. Various options for exemplary first transparent electrodes are detailed in U.S. patent application Ser. No. 15/982,677, the teachings of which relating to transparent electrodes comprising conductive polymer and/or conductive nanoparticle are hereby incorporated herein by reference.

With continued reference to FIG. 1, the dielectric layer 500 is located between (optionally directly between, i.e., contacting both) the first transparent electrode 200 and the elastomer layer 300. The dielectric layer can, among other things, help avoid electrical shorting of the EOD.

The dielectric layer 500 preferably is a transparent dielectric layer. In such cases, the transparent dielectric layer can optionally comprise (or consist of, or at least consist essentially of) an elastomer. Another option is for the transparent dielectric layer to be an inorganic layer, which may be deposited by sputtering, CVD, or other conventional deposition processes.

Preferably, the dielectric layer 500 comprises (e.g., includes, consists essentially of, or consists of) a polymer. Suitable polymers include a polyimide, a silicone-based polymer, and polyethylene terephthalate (PET). Thus, the dielectric layer 500 may be a silicone-based polymer, such as a PDMS polymer. In certain embodiments, the silicone-based polymer is SYLGARD® 184 (Dow Corning). It is envisioned, however, that other polymers (e.g., PVP, PVA, or Perylene), including other silicone-based polymers, can be used.

For embodiments where the dielectric layer 500 is formed from a curable polymer composition, it preferably has a low viscosity (e.g., less than 200 cps) before curing. In some cases, the dielectric layer 500 is formed from a water-based polyester resin.

In certain preferred embodiments, the dielectric layer 500 is formed of a polymeric coating sold commercially under the product name PolyGloss™. This material is commercially available from DyePress Graphic Supply of Scottsdale, Ariz., U.S.A. The PolyGloss™ coating is a 2-part, water-based polyester resin. Various other hard polymeric coatings of this nature can alternatively be used.

In some cases, the dielectric layer 500 is a single layer of a single dielectric material or a single layer comprising a mixture of different dielectric materials. In other cases, the dielectric layer 500 comprises a plurality of sublayers (e.g., two or more sublayers), optionally formed of different dielectric materials.

The dielectric layer 500 has a greater stiffness than the elastomer layer 300. Preferably, the dielectric layer 500 has an elastic modulus of greater than 100 MPa, or perhaps more preferably greater than 1 GPa. This may be the case for any embodiment of the present disclosure.

Additionally or alternatively, a ratio of the elastic modulus of the dielectric layer 500 to the elastic modulus of the elastomer layer 300 can optionally be greater than 5,000:1, greater than 50,000:1, or greater than 100,000:1. This too may be the case for any embodiment of the present disclosure.

The elastic modulus (also known as the modulus of elasticity or Young's modulus) measures the resistance of an object or a substance to being deformed elastically (i.e., non-permanently) when a stress is applied to it. The elastic modulus of an object is defined as the slope of its stress-strain curve in the elastic deformation region. The greater the stiffness of a material, the higher its elastic modulus, whereas the lesser the stiffness of a material, the lower its elastic modulus.

The dielectric layer 500 will typically have a thickness in a range of 0.5-50 microns. Preferably, the thickness of the dielectric layer 500 is in a range of from 1 to 10 microns. This can optionally be the case for any embodiment of the present disclosure. In some cases, the thickness of the dielectric layer 500 is 10 microns. In other cases, the thickness is less than 10 microns, less than 8 microns, or even less than 5 microns, while preferably being greater than 1 micron. In preferred embodiments of the present disclosure, the thickness of the dielectric layer 500 is within one or more (e.g., all) of these ranges.

In certain embodiments, a ratio of the thickness of the elastomer layer 300 to the thickness of the dielectric layer 500 is greater than or equal to 1 and less than or equal to 3.33. This ratio can be used particularly advantageously, for example, when the thickness of the dielectric layer 500 is in a range of from 1 to 10 microns.

In certain embodiments, the dielectric layer 500 is an extruded film, which can optionally have a thickness of 10-25 microns. In such embodiments, the dielectric layer 500 (e.g., an extruded film of PET) can optionally be adhered or laminated to substrate 100 (with the first transparent electrode therebetween). Substrate 100 may be glass in such cases. In other cases, the dielectric layer may itself support the rest of the OED, such as in suspended film embodiments. In such embodiments, the OED is self-supporting and mounted in the between-pane space of an IG unit. Another possibility is to have the OED carried by (e.g., adhered to) a separate self-supporting film (other than the dielectric layer).

The dielectric layer 500, unless it is an extruded film, can be deposited using doctor blade coating. Alternatively, the dielectric layer 500 can be deposited by other well-known coating techniques, including, but not limited to, spin coating, slot die coating and spray coating.

Preferably, the dielectric layer 500 has a dielectric strength of 170 V/micron or higher. In addition, this layer 500 can optionally have a dielectric constant of at least 3 (such as from 3 to 5), a Shore A hardness above 65, or both. The dielectric layer 500 can optionally have these properties in any embodiment of this disclosure.

Dielectric strength is the maximum electric field a material can withstand under ideal conditions before experiencing an electrical breakdown and losing its insulating properties so as to become electrically conductive. Dielectric strength is dependent upon temperature and electric field frequency; the values of dielectric strength reported herein are at room temperature and frequencies from $10^{-1}$ to $10^5$ Hz.

Dielectric constant, or relative permittivity, of a material is its permittivity expressed as a ratio to the vacuum permittivity. Permittivity is a measure of the electric polarizability of the material. A material with high permittivity polarizes more in response to an electric field, storing more energy.

As is well known, Shore hardness can be measured in accordance with ASTM D2240, the teachings of which are incorporated herein by reference. As is well known, there are different scales of Shore hardness, including the Shore A hardness scale and the Shore OOO hardness scale, which are referred to herein, and each scale has its own test apparatus.

Referring again to FIG. 1, the illustrated elastomer layer 300 is in contact with the dielectric layer 500. The elastomer layer 300 is compliant (e.g., soft and readily deformable).

Regardless of the exact composition of the elastomer layer 300, it preferably is a dielectric elastomer. It also preferably is transparent. Thus, for any embodiment of the present disclosure, the elastomer layer 300 preferably is a transparent dielectric elastomer layer.

Preferably, the elastomer layer 300 has a Shore OOO hardness of less than 15, and an elastic modulus of less than 20 kPa. While this is optional, it can advantageously be the case for any embodiment of the present disclosure. In addition, the elastomer layer 300 preferably has a yield strength (based on a 1% offset) of less than 10 kPa, or even less than 5 kPa, such as 1-4 kPa. Furthermore, the elastomer layer 300 may have a dielectric constant in a range of from 2.5 to 3.2.

Yield strength is the minimum stress that produces permanent plastic deformation. The yield strength is usually defined at a specific amount of plastic strain, or offset, which may vary by material and or specification. The offset is the amount that the stress-strain curve deviates from the linear elastic line. The most common offset for polymers is 1%, which is used herein.

In preferred embodiments, the second transparent electrode 400 has a yield strength of greater than 0.5 MPa, more preferably greater than 1 MPa, and perhaps optimally greater than 2 MPa. In any embodiment of the present disclosure, the second transparent electrode 400 can optionally have a yield strength in one or more (e.g., all) of the ranges noted in this paragraph. Preferably, this is in combination with having an elastic modulus in any one or more (e.g., all) of the ranges noted in the previous paragraph.

If desired, the elastomer layer 300 can (e.g., in addition to having a Shore OOO hardness and an elastic modulus within the ranges just noted) have a loss coefficient of less than 0.3, a fatigue ratio of greater than 0.1, or both. Preferably, the fatigue ratio is greater than 0.3, and more preferably greater than 0.5.

Loss coefficient is a material parameter of cyclic loading that measures the fraction of mechanical energy lost in a stress strain cycle. The loss coefficient for each material is a function of the frequency of the cycle. A high loss coefficient can be desirable for damping vibrations, while a low loss coefficient transmits energy more efficiently. The loss coefficient is a factor in resisting fatigue failure. If the loss coefficient is too high, cyclic loading will dissipate energy into the material, thereby leading to fatigue failure.

Fatigue ratio (also known as endurance limit) is a dimensionless ratio of the stress required to cause fatigue failure after a specific number of cycles to the yield stress of a material. Fatigue tests are generally run through $10^7$ or $10^8$ cycles.

The elastomer layer 300 may comprise a material selected from the group consisting of ethylene-vinyl acetate (EVA), urethane, acrylic (e.g., VHB acrylic from 3M Company of St. Paul, Minn.), polyvinyl butyral (PVB), silicone, and any mixtures thereof. Preferably, the elastomer layer 300 comprises silicone, e.g., is a silicone-based polymer. In some cases, the elastomer layer 300 is a polymethylsiloxane (PDMS) polymer.

In one group of preferred embodiments, the elastomer layer 300 is formed of a silicone gel characterized by being substantially devoid (or completely devoid) of unreacted sites. Skilled artisans will appreciate that a material having "unreacted sites" refers to a polymer material that contains non-crosslinked chains in the polymer matrix (i.e., where such chains are not incorporated into the polymer network during the cross-linking process). For any embodiment of this disclosure, the elastomer layer 300 can optionally have this composition. Such materials can be particularly advantageous for device longevity, stability, and optical performance. One example material is the Wacker 613 SilGel™ silicone gel, which is commercially available from Wacker Chemie AG of Munich, Germany. This material has a Shore OOO hardness of less than 15, an elastic modulus of less than 20 kPa, and a yield strength of less than 10 kPa.

The elastomer layer 300 in the embodiment of FIG. 1 is depicted as being a single film. However, it is to be appreciated that the elastomer layer 300 can comprise two or more films or sublayers, if so desired. For example, the elastomer layer 300 can comprise two films or sublayers formed of two different elastomers.

In preferred embodiments, the elastomer layer 300 has a total thickness in a range of 1-10 microns, or less than 8 microns, less than 7 microns, or less than 5 microns, while preferably being greater than 1 micron. For any embodiment of the present disclosure, the elastomer layer 300 can optionally have a thickness in any one or more (e.g., all) of these thickness ranges. It is contemplated, however, that in alternate embodiments, the elastomer layer 300 can have a thickness of up to 250 microns (e.g., in a range of 100-250 microns or 100-150 microns). In such instances, the thicker elastomer layer may necessitate a higher voltage to switch the EOD between its first and second states as compared to a thinner elastomer layer.

In some cases, the elastomer layer 300 is deposited via doctor blade coating, which is a well-known coating technique. In doctor blade coating, the thickness of the layer being applied can be varied by different gap distances between the surface of the substrate being coated and the doctor blade. In other cases, the elastomer layer 300 is deposited by spin coating, slot die coating, or spray coating.

With continued reference to FIG. 1, the second transparent electrode 400 is a top electrode of the EOD 10. The second transparent electrode 400 is compliant. In certain embodiments (e.g., where the second transparent electrode comprises electrically conductive polymer), the second transparent electrode 400 has a low elastic modulus, thus allowing it to change shape easily. In such cases, for example, the second transparent electrode 400 may have an elastic modulus of less than 5 GPa.

The second transparent electrode 400 can comprise one or more of carbon nanotubes (e.g., single-walled carbon nanotubes), silver nanowires, electrically conductive polymer, and electrically conductive nanoparticles. In other cases, conductive films of gold, silver, or aluminum are used.

Thus, in some cases, the second transparent electrode 400 comprises carbon nanotubes (e.g., single-walled carbon nanotubes), silver nanowires, or both. When provided, the carbon nanotubes and/or silver nanowires can form a mesh or network. In such embodiments, the second transparent electrode 400 preferably has a thickness of from 7.5-12.5 nm, or from 8.5-11.5 nm, such as about 10 nm.

In embodiments where the second transparent electrode 400 comprises carbon nanotubes, it preferably has five mg of CNs per square foot or less, or perhaps more preferably four mg of CNs per square foot or less.

When provided, carbon nanotubes of the second transparent electrode 400 can be deposited onto the elastomer layer 300 by, as one example, forming a stable colloidal suspension of carbon nanotubes, and then forming it into a percolating mat by filtration and contact pressing it onto the elastomer layer. One useful technique is described in Shian et al., *Highly Compliant Transparent Electrodes*, 2012, Applied Physics Letters 101 (6): 061101, doi: 10.1063/1.4742889, the teachings of which are incorporated herein by reference insofar as they relate to preparing and depositing carbon nanotubes as a transparent electrode layer.

As another example, carbon nanotubes can be deposited by spraying a dispersion of them in a solution using commercially available ultrasonic spray coating equipment (such as from Nadetech Innovations S.L., of Navarra, Spain). The surface can be treated (e.g., chemically, with UV, ozone, or plasma) to affect the surface wetting of the CNT solution, the substrate can be heated to speed up drying of the solution, and the atmosphere (e.g., inert gas, vacuum, humidity) can optionally be controlled during the deposition process. The dispersion can be purchased commercially, or it can be produced by dispersing dry nanotubes in a solution. In such cases, the solution may comprise water, alcohols, organic solvents, surfactants, and other compounds. The nanotubes may be purified or functionalized. Alternatively, a method such as slot die coating could be used to deposit the carbon nanotubes.

When provided, the carbon nanotubes preferably are single-walled carbon nanotubes. This can advantageously be the case for any embodiment wherein the second transparent electrode 400 comprises carbon nanotubes. Carbon nanotubes can be purchased from such commercial suppliers as Nanostructured & Amorphous Materials, Inc., of Katy, Tex., U.S.A.

In embodiments where the second transparent electrode 400 comprises silver nanowires, various deposition techniques can be used. As one example, silver nanowires can be deposited by spraying a dispersion of them in a solution using commercially available ultrasonic spray coating equipment. The surface can be treated (e.g., chemically, with UV, ozone, or plasma) to affect the surface wetting of the AgNW solution, the substrate can be heated to speed up drying of the solution, and the atmosphere can optionally be controlled during the deposition process. The dispersion can be purchased commercially, or it can be produced by dispersing dry silver nanowires in a solution. In such cases, the solution may comprise water, alcohols, organic solvents, surfactants, and other compounds. The silver nanowires may be purified or functionalized. Alternatively, a method such as slot die coating could be used to deposit silver nanowires.

Silver nanowires can also be purchased from various commercial suppliers, such as Nanostructured & Amorphous Materials, Inc. The silver nanowires can be purchased in dry form or in the form of a suspension of silver together with ethanol, isopropanol, or water.

As noted above, in some cases, the second transparent electrode 400 comprises an electrically conductive polymer, electrically conductive nanoparticles, or both. Such materials can provide exceptional compliancy in terms of being able to match the strains obtainable with the elastomer layer (e.g., over 100 percent and up to several hundred percent). These materials also provide advantageous process control. For example, these materials may be particularly easy to deposit. When provided, the conductive polymer and/or conductive nanoparticles enable the second transparent electrode 400 to be deposited at room temperature. This makes it possible to use certain temperature-sensitive materials (e.g., plastics) in the EOD 10, particularly adjacent the second transparent electrode 400. Moreover, when using conductive polymer and/or conductive nanoparticles, such materials may provide advanced characteristics to the second transparent electrode 400 in terms of being so compliant and deformable as not to exhibit undue stiffness or cracking over time.

Various options for providing the second transparent electrode 400 in a form comprising conductive polymer and/or conductive nanoparticles are detailed in U.S. patent application Ser. No. 15/982,677, the teachings of which relating to conductive polymer and/or conductive nanoparticle electrodes are hereby incorporated herein by reference.

In some cases, the second transparent electrode 400 comprises: (i) carbon nanotubes and/or electrically conductive nanowires (e.g., silver nanowires), and (ii) electrically conductive polymer.

In one example, silver nanowires are embedded in an electrically conductive polymer layer using an electrohydrodynamic atomization technique. One exemplary technique is described in Duraisamy et al., *Deposition and Characterization of Silver Nanowires Embedded PEDOT: PSS Thin Films via Electrohydrodynamic Atomization*, 2013, Chemical Engineering Journal, Volume 225, 1 Jun. 2013, Pages 887-894, the teachings of which are hereby incorporated by reference insofar as they relate to embedding silver nanowires in an electrically conductive polymer layer.

Figure 2:
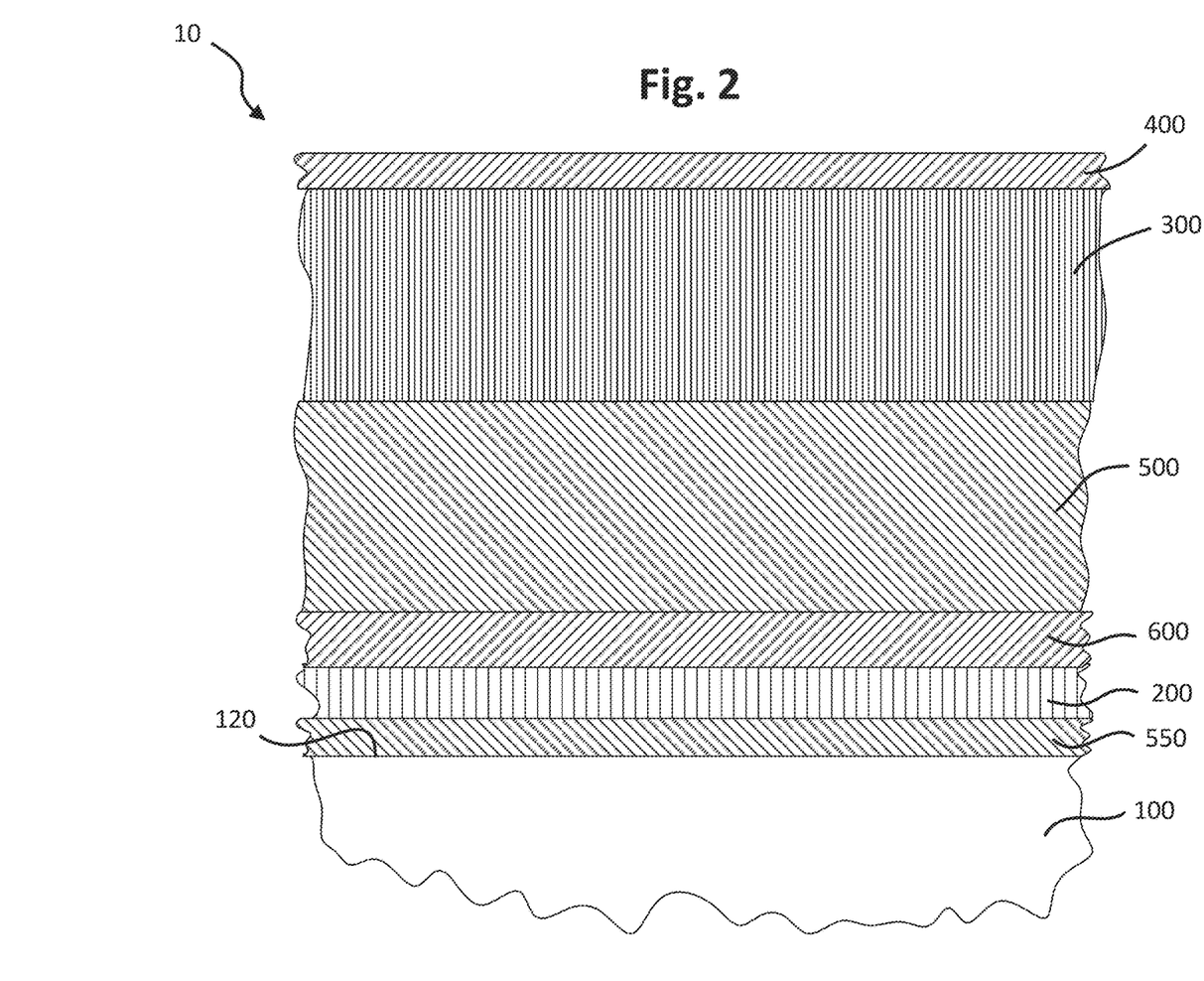
FIG. 2 is a schematic, broken-away cross-sectional view of an elastomeric optical device in accordance with other embodiments of the present disclosure.

Referring now to the embodiment of FIG. 2, the EOD 10 can comprise, in sequence, the substrate 100, a base film 550, the first transparent electrode 200, an overcoat film 600, the dielectric layer 500, the elastomer layer 300, and the second transparent electrode 400. The base film 550 can be in contact with the substrate 100; the first transparent electrode 200 can be in contact with the base film 550; the overcoat film 600 can be in contact with the first transparent electrode 200; the dielectric layer 500 can be in contact with the overcoat film 600; the elastomer layer 300 can be in contact with the dielectric layer 500; and the second transparent electrode 400 can be in contact with the elastomer layer 300. As can be appreciated by comparing FIGS. 1 and 2, the base film 550 and the overcoat film 600 are optional. Thus, one or both of them may be omitted.

As shown in FIG. 2, the optional base film 550 can be provided between the substrate 100 and the first transparent electrode 200. The base film 550 can be provided as an adhesion layer and/or a diffusion barrier to prevent (or at least reduce) diffusion of material (such as sodium ions in the case of soda-lime glass) from the substrate 100 into the first transparent electrode 200.

When provided, the base film 550 may comprise, consist essentially of, or consist of silica, alumina, or a mixture of both. In other embodiments, the base film 550 comprises tin oxide (e.g., $SnO_2$). In such embodiments, the base film 550 may be devoid of indium. For example, a base film 550 consisting of (or at least consisting essentially of) tin oxide is provided in some cases. In still other embodiments, the base film comprises (or consists essentially of, or consists of) silicon nitride or silicon oxynitride. Compounds of two or more of silica, silicon nitride, alumina, and tin oxide can be used. Preferably, the base film 550 comprises silica, silicon nitride, and/or silicon oxynitride (optionally with some aluminum).

While the base film 550 is shown as a single layer, it can alternatively comprise a plurality of sublayers. Where provided, the base film 550 preferably has a total thickness of 50 Å or more, such as about 70-300 Å. In certain embodiments, the base film 550 has a total thickness of 75-150 Å. In one example, the base film 550 has a total thickness of about 100 Å.

With continued reference to FIG. 2, an optional overcoat film 600 can be located over the first transparent electrode 200. In such cases, the dielectric layer 500 is separated from the first transparent electrode 200 by the overcoat film 600. In some cases, the overcoat film 600 comprises silicon oxynitride. In other cases, the overcoat film 600 comprises tin oxide, which preferably is devoid of indium oxide. In such cases, the overcoat film 600 preferably contains at least 75% tin, at least 85% tin, or at least 95% tin (on a metal-only basis), while also being devoid of indium oxide. For example, the overcoat film 600 may consist of (or at least consist essentially of) tin oxide (e.g., $SnO_2$). Alternatively, the overcoat film 600 can comprise silicon nitride.

When provided, the overcoat film 600 preferably has a thickness in a range of from 675-1,125 Å. For example, the overcoat film 600 can have a thickness in a range of 775-1,025 Å, or from 875-925 Å. In some cases, the overcoat film 600 has a thickness of about 900 Å. In other cases, it has a thickness of about 940 Å. If desired, silicon oxynitride (optionally including some aluminum) can be used at any thickness range noted in this paragraph. This can optionally be the case for any embodiment where the overcoat film 600 is provided.

When provided, the optional base film 550 and the optional overcoat film 600 can be formed by sputtering. Sputtering is well known in the present art. Reference is made to Pfaff's U.S. Pat. No. 9,862,640, the teachings of which are incorporated by reference herein insofar as they describe sputtering. It should be noted, however, that these films are not restricted to being formed by such methods, and other conventional techniques can be used.

As discussed above, certain embodiments of the EOD 10 do not have (i.e., are devoid of) a separate substrate. FIG. 3 shows a non-limiting example of one such embodiment.

Specifically, in the embodiment of FIG. 3, the EOD 10 comprises, in sequence, the first transparent electrode 200, the dielectric layer 500, the elastomer layer 300, and the second transparent electrode 400. In embodiments like that shown in FIG. 3, the EOD 10 is self-supporting. Although not shown in FIG. 3, one more additional layers, such as a base film 550 and/or an overcoat film 600, can optionally be included in such an EOD 10.

The second transparent electrode 400 has a relatively low sheet resistance. Preferably, it is in a range of 5-1,000 ohms/square, such as 5-250 ohms/square, or 10-60 ohms/square. For any embodiment of the present disclosure, the second transparent electrode 400 can optionally have a sheet resistance in one or more (e.g., all) of the ranges noted in this paragraph. In addition, the first transparent electrode 200 can optionally have a sheet resistance in one or more (e.g., all) of the ranges noted in this paragraph. Sheet resistance can be measured in standard fashion using a non-contact sheet resistance meter.

The second transparent electrode 400 preferably also has low emissivity. Specifically, the second transparent electrode 400 preferably has an emissivity of less than 0.5, such as less than 0.4, or less than 0.3.

The term "emissivity" is well known in the present art. This term is used herein in accordance with its well-known meaning to refer to the ratio of radiation emitted by a surface to the radiation emitted by a blackbody at the same temperature. Emissivity is a wavelength dependent property, and the emissivity at each wavelength must equal the absorptivity. But it can be useful to calculate a single emissivity value that considers all of the relevant wavelengths of light. The present emissivity values can be determined as specified in "Standard Test Method for Emittance of Specular Surfaces Using Spectrometric Measurements," NFRC 301-2010, the entire teachings of which are incorporated herein by reference.

The second transparent electrode 400 preferably has a visible absorption of less than or equal to 6%, more preferably less than or equal to 4%, and perhaps optimally less than or equal to 2%. As is well-known to skilled artisans, visible absorption (expressed as a percentage) equals 100 minus $T_{vis}$ minus $R_{vis}$.

In certain embodiments, the second transparent electrode 400 has the following combination of properties: a sheet resistance in a range of 5-1,000 ohms/square, an emissivity of less than 0.5, and a visible absorption of less than or equal to 6%. Preferably, the second transparent electrode 400 has a sheet resistance in a range of 10-60 ohms/square, an emissivity of less than 0.3, and a visible absorption of less than or equal to 2%. Either of these two combinations of properties can optionally be provided for the second transparent electrode 400 of any embodiment of this disclosure. In addition, the second transparent electrode 400 preferably has a fatigue ratio of greater than 0.1, more preferably greater than 0.3, and perhaps optimally greater than 0.5.

The optical properties of the EOD 10 can be controlled electrically. By providing a voltage to the first 200 and second 400 transparent electrodes, it is possible to change the visible transmission properties of the EOD 10. Specifically, when a voltage is provided to the first 200 and second 400 transparent electrodes, these electrodes 200, 400 establish an electric field between them and across the dielectric and elastomer layers 500, 300. In response to such an electric field being established (by providing an activation voltage), the first 200 and second 400 transparent electrodes are attracted to each other, such that the second transparent electrode 400 compresses the elastomer layer 300. This involves the elastomer layer 300 being compressed by the second transparent electrode 400, against the dielectric layer 500. The compression of the elastomer layer 300 may cause it to bulge outwardly in some places. Once the applied voltage is lowered sufficiently or removed, the elastomer layer 300 returns to its original (or "static") state, in which state the elastomer layer may be un-compressed or at least less compressed. Thus, by applying, removing, or otherwise adjusting the voltage applied to the first 200 and second 400 transparent electrodes, it is possible to switch the EOD 10 between a transparent state (i.e., the first optical state) and a translucent or opaque state (i.e., the second optical state).

The EOD 10 can be switched reversibly between its first optical state 20 and its second optical state 30. The EOD 10 preferably can do so without observable degradation or damage. Thus, the EOD 10 and its layers preferably maintain their original properties (e.g., electrical and optical properties) even after the voltage has been raised to the activation voltage, maintained at such level for a desired time, and thereafter lowered or removed.

At least certain portions of the second transparent electrode 400 are closer to the first transparent electrode 200 when the EOD 10 is in the second optical state than they are when the EOD 10 is in the first optical state. This results in the second transparent electrode 400 having a surface topography that is characterized by greater roughness, less flatness of its outer face, or both when the EOD 10 is in the second optical state compared to when the EOD is in the first optical state. This can be appreciated by comparing FIG. 4a (schematically showing the EOD 10 in the first optical state) and FIG. 4b (schematically showing the EOD in the second optical state).

Surface roughness is defined herein in terms of deviations from the mean surface level. The surface roughness $R_a$ is the arithmetical mean surface roughness. This is the arithmetic average of the absolute deviations from the mean surface level. The arithmetical mean surface roughness of a coating is commonly represented by the equation: $R_a = 1/L \int_0^L |f(x)| dx$. The surface roughness $R_a$ can be measured in conventional fashion, e.g., using an Atomic Force Microscope (AFM) equipped with conventional software that gives $R_a$.

In some embodiments, the surface topography of the EOD 10 is characterized by pits and/or wrinkles when the EOD is in the second optical state. Such deformations may include both dimples and bulges (e.g., bumps). When present, wrinkles may comprise or form ridges or lines, akin to the ridges or lines of a person's fingertip (i.e., fingerprints). Pits or "dimples" are recesses (e.g., concavities) and may in some cases be generally round. This can be thought of, in a very general or schematic way, as being akin to the dimples on a golf ball. It should be noted that surface deformations of the EOD will normally be present on a microscopic scale.

Figure 4A:
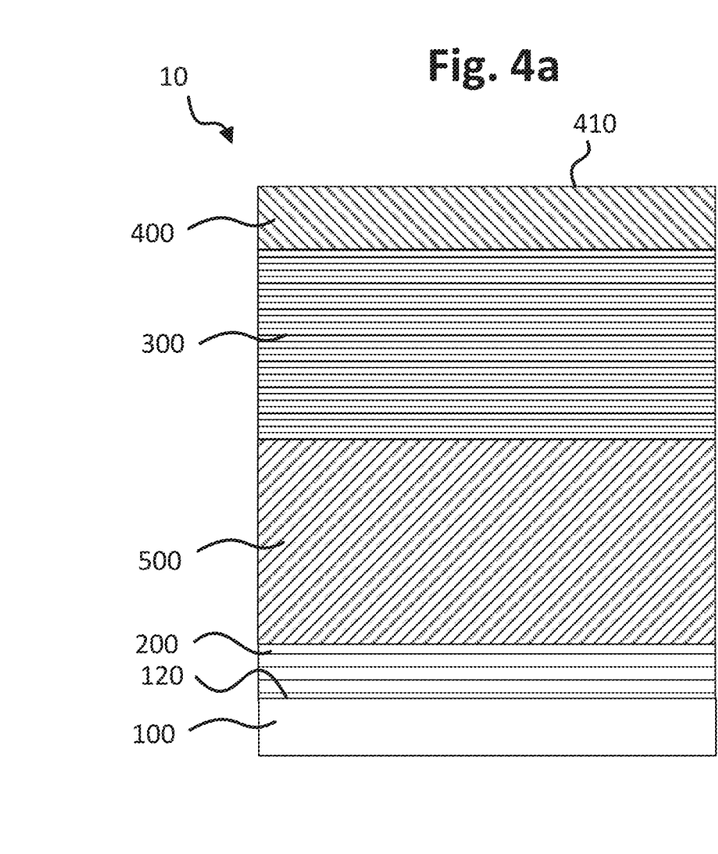
FIG. 4a is a schematic cross-sectional view of an elastomeric optical device in accordance with certain embodiments of the present disclosure, with the device shown in its first optical state.

As shown schematically in FIG. 4a, an upper surface 410 of the second transparent electrode 400 may initially be generally planar. When the activation voltage is applied, the upper surface 410 pits and/or wrinkles (as shown schematically in FIG. 4b). The deformation process is reversible, such that the pits and/or wrinkles appear when the activation voltage is applied and disappear when the voltage is removed or lowered sufficiently.

Figure 4B:
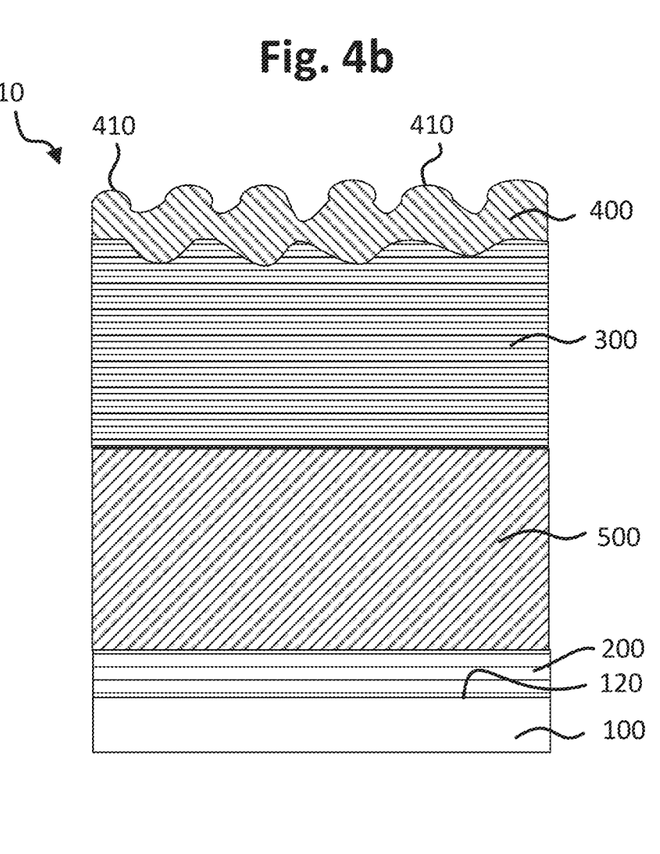
FIG. 4b is a schematic cross-sectional view of the elastomeric optical device of FIG. 4a shown in its second optical state.

The pitting and/or wrinkling causes changes in the optical properties of the EOD. Specifically, pitting or wrinkling of a surface (e.g., upper surface 410) causes diffuse visible transmission and light scattering, thereby reducing the direct (i.e., non-diffuse) transmission of visible radiation through the surface. Thus, when the EOD is in the second optical state (i.e., is translucent or opaque), it is because pits and/or wrinkles of the EOD cause light to scatter. To the contrary, when the EOD is in the first optical state (i.e., is transparent), it has an absence of pitting and wrinkling or at least minimal pitting and wrinkling.

The thicknesses of one or more layers of the EOD can be adjusted to achieve a desired surface topography when the device is in the second optical state. For example, when the elastomer layer 300 is thicker, it may produce larger or differently configured pits and/or wrinkles.

If desired, either the elastomer layer 300 or the second transparent electrode 400 (or each of them) can have one or more non-uniformity features. When provided, the one or more non-uniformity features are present when the EOD 10 is in the first optical state. Such non-uniformity features, explained in greater detail below, may help achieve optical characteristics that impact the performance of the EOD.

In some embodiments, the second transparent electrode 400 has one or more non-uniformity features. The one or more non-uniformity features can comprise non-uniform thickness. Thus, one or more areas of the second transparent electrode 400 may be thinner than other areas of the second transparent electrode. Another option is for the second transparent electrode 400 to have non-uniform surface roughness.

Additionally or alternatively, the elastomer layer 300 may have one or more non-uniformity features. When provided, this can be in addition to, or instead of, the second transparent electrode having one or more non-uniformity features. In certain embodiments, such one or more non-uniformity features comprise non-uniform thickness of the elastomer layer. Thus, certain areas of the elastomer layer 300 may be thinner than other areas of the elastomer layer. In such cases, the non-uniform thickness of the elastomer layer may, for example, be characterized by an average peak-to-valley distance that is at least 25 nm, such as in a range of 25-50 nm.

Although certain preferred thickness values have been provided for the different layers of the EOD 10, it is to be understood that any of the thickness values can be varied to suit a particular application. For example, it is possible for one or more of the thickness values to deviate considerably from preferred thickness values reported herein. In addition, it is by no means required that either the elastomer layer or the second transparent electrode have deliberate non-uniformity features.

In any embodiment of the present disclosure, the EOD 10 can be part of an insulating glazing unit ("IG unit") 40. As shown in FIG. 5, the IG unit 40 includes an interior pane 100 and an exterior pane 105 separated by a between-pane space 45. A spacer 50 (which can optionally be part of a sash) is commonly provided to separate the panes 100, 105. The spacer 50 can be secured to the internal surface of each of panes 100, 105 using an adhesive or seal 55. In some cases, an optional end sealant (or "second seal") 60 is also provided.

In FIG. 5, the exterior pane 105 has an external surface 130 (the #1 surface) and an internal surface 140 (the #2 surface). The interior pane 100 has an internal surface 120 (the #3 surface) and an external surface 110 (the #4 surface). In other embodiments, the IG unit 40 has three panes, such that the external surface of the inboard pane is a #6 surface.

The IG unit 40 can optionally be mounted in a frame (e.g., a conventional window sash or frame) such that the external surface 130 of the exterior pane 105 is exposed to an outdoor environment 77 (and thus is exposed to periodic contact with rain) while the external surface of the inboard pane is exposed to a room-side environment (e.g., an ambient environment inside a building). Each internal surface of the IG unit 40 faces toward a between-pane space 45 of the IG unit. In some embodiments, the IG unit 40 is a vacuum IG unit.

In the embodiment of FIG. 5, the internal surface 120 of the interior pane 100 is defined by substrate 100 of EOD 10. Here, the EOD 10 is exposed to a between-pane space 45 of the IG unit 40. While it would be possible to provide EOD 10 on the #1 or #4 surface, it preferably is on either the #2 or #3 surface. In the case of a triple-pane IG unit, the EOD preferably is on the #2 surface, the #3 surface, the #4 surface, or the #5 surface. Such arrangements ensure that the EOD is protected against potential durability issues caused by water, physical contact, or the like.

Alternatively, the EOD 10 can be a suspended film device. For example, a stretched film (e.g., a polymer film) can be provided between two glass panes of an IG unit. In such cases, the stretched film forms part of the EOD, and permits it to be suspended between, and spaced from, such two glass panes 100, 105.

The IG unit 40 may also include one or more low-emissivity coatings 70. In the embodiment of FIG. 5, the IG unit 40 includes a low-emissivity coating 70 on the internal surface 140 of the exterior pane 105. When provided, the low-emissivity coating 70 preferably includes at least one silver-inclusive film, which can advantageously contain more than 50% silver by weight (e.g., a metallic silver film). If desired, the low-emissivity coating 70 can alternatively be on the internal surface 120 of pane 100 (provided that the EOD 10 is on another surface of the same pane or another pane). Thus, when the low-emissivity coating is provided, it preferably is on the #2 surface of the IG unit, but it may alternatively be on the #3 surface. In some embodiments, the coating 70 includes three or more infrared-reflective films (e.g., silver-containing films). Low-emissivity coatings with three or more infrared-reflective films are described in U.S. patent Ser. No. 11/546,152 and U.S. patent Ser. No. 11/545,211 and U.S. Pat. Nos. 7,572,511 and 7,572,510 and 7,572,509 and 7,342,716 and 7,339,728, the teachings of each of which are incorporated herein by reference. In other cases, the low-emissivity coating can be a "single silver" or "double silver" low-emissivity coating, which are well-known to skilled artisans.

When the EOD 10 is in the first optical state, it has a high visible transmittance. In some cases, the visible transmission of the EOD 10 when in the first optical state is at least 75%, such as 75%-90%. Preferably, the visible transmission is in a range from 85-90%. The visible transmission numbers reported in this paragraph are for the EOD in monolithic form (e.g., as shown in FIG. 4A).

The term "visible transmittance" is well known in the art and is used herein in accordance with its well-known meaning to refer to the percentage of all incident visible radiation that is transmitted through an IG unit. Visible transmittance, as well as visible reflectance, can be determined in accordance with NFRC 300-2014, Standard Test Method for Determining the Solar and Infrared Optical Properties of Glazing Materials and Fading Resistance of Systems. The well-known WINDOW 7.1 computer program can be used in calculating these and other reported optical properties.

The invention also provides methods of operating an EOD 10. In the present methods, an OED 10 according to any device embodiment of the present disclosure can be used. The methods involve applying voltage between the first 200 and second 400 transparent electrodes to establish an electric field therebetween.

In one group of embodiments, the method comprises operating the first transparent electrode 200 as a cathode and operating the second transparent electrode 400 as an anode. In some embodiments of this nature, the first transparent electrode 200 comprises a transparent conductive oxide film, such as an indium tin oxide. The activation voltage may be in a range of from 40 to 350 Volts, or preferably less than 200 Volts, less than 175 Volts, or even less than 150 Volts, while being greater than 40 Volts.

In the embodiment group just discussed, the elastomer layer 300 and the dielectric layer 500 preferably each have a thickness in a range of from 1 to 10 microns. In addition, the device 10 can advantageously have a ratio of the thickness of the elastomer layer 300 to the thickness of the dielectric layer 500 in a range of from 1 to 3.3. Furthermore, the elastomer layer preferably has a Shore OOO hardness of less than 15 and an elastic modulus of less than 20 kPa. In addition, the elastomer layer can optionally have a yield strength of less than 10 kPa, or even less than 5 kPa. In some cases, the elastomer layer 300 in the present embodiment group comprises a silicone gel characterized by being substantially devoid (or completely devoid) of unreacted sites.

With respect to the method embodiments generally, in response to an activation voltage being applied, the second transparent electrode 400 compresses the elastomer layer 300. This generates pits, wrinkles, or both. Thus, when the activation voltage is provided, the elastomeric optical device 10 is in the second optical state due to the elastomer layer 300 being compressed between the first and second transparent electrodes 200, 400. In this manner, the EOD 10 switches from the first optical state to the second optical state. It is to be appreciated that in the method embodiments generally, the first transparent electrode 200 can be operated as the cathode or the anode.

The activation voltage preferably is in a range of from 40 to 350 Volts, such as from 40 to 250 Volts. In some cases, the activation voltage is less than 200 Volts, less than 175 Volts, or even less than 150 Volts, while being greater than 40 Volts.

After maintaining the EOD 10 in the second optical state for a desired period of time, the method subsequently involves switching the EOD from the second optical state to the first optical state. In general, this may involve lowering or removing the voltage applied between the first 200 and second 400 transparent electrodes.

In one group of embodiments, after maintaining the EOD 10 in the second optical state for a desired time period, the method includes transitioning to providing a recovery voltage across the first and second transparent electrodes 200, 400. In the present embodiment group, the recovery voltage is a non-zero voltage that is lower than, and has the same polarity as, the activation voltage. In these embodiments, the elastomeric optical device 10 changes from the second optical state to the first optical state in response to transitioning to the recovery voltage. It has been discovered that the device may recover (i.e., return to the first optical state/go clear) more swiftly by transitioning from the activation voltage to the recovery voltage, as compared with switching to zero voltage. In some embodiments of this nature, the recovery voltage is at least 25 Volts lower, at least 50 Volts lower, or at least 100 Volts lower than the activation voltage. In such cases, the activation voltage may be in a range of from 150 to 350 Volts, such as 350 V, while the recovery voltage is from 5 to 100 Volts, such as 50 V. These voltage range details, however, are by no means required.

In the embodiment group just discussed, the method preferably involves using an OED 10 wherein the elastomer layer 300 and the dielectric layer 500 each have a thickness in a range of from 1 to 10 microns. In addition, the device 10 can optionally have a ratio of the thickness of the elastomer layer 300 to the thickness of the dielectric layer 500 in a range of from 1 to 3.3. Furthermore, the elastomer layer preferably has a Shore OOO hardness of less than 15 and an elastic modulus of less than 20 kPa. Also, the elastomer layer can optionally have a yield strength of less than 5 kPa. In some cases, the elastomer layer 300 in the present embodiment group comprises a silicone gel characterized by being substantially devoid of unreacted sites.

Further, in the embodiment group that involves using a recovery voltage, the first transparent electrode can optionally be operated as a cathode while the second transparent electrode is operated as an anode. In such cases, the first transparent electrode can optionally comprise a transparent conductive oxide film, such as indium tin oxide.

In other embodiments, the polarity of the electric field is reversed in order to switch the EOD 10 between its first and second states.

In the method embodiments generally, at least certain portions of the second transparent electrode are closer to the first transparent electrode when the elastomeric optical device is in the second optical state than they are when the elastomeric optical device is in the first optical state. The elastomeric optical device has a surface topography that is characterized by greater roughness when the elastomeric optical device is in its second optical state than when it is in its first optical state. The surface topography of the elastomeric optical device, when in the second optical state, preferably is characterized by pits, wrinkles, or both. For example, the surface topography of the elastomeric optical device, when in the second optical state, can advantageously include at least (e.g., more than) 100,000 pits/cm$^2$, such as from 100,000 pits/cm$^2$ to 10 million pits/cm$^2$.

As noted above, the EOD can be switched reversibly and repeatedly between the first and second optical states.

Following is one non-limiting example of an elastomeric optical device and its operation.

EXAMPLE

A sputtered ITO-based coating (comprising an ITO film serving as the first transparent electrode 200) having a total thickness of about 2,150 angstroms was deposited onto a sheet of 3 mm soda-lime glass by sputtering. The ITO film comprises 90% indium/10% tin on a metal-only basis. The ITO-based coating includes base layer of silicon dioxide (including some aluminum) between the glass and the ITO film, and a silicon oxynitride overcoat layer directly over the ITO film. In this example, the base layer had a thickness of 100 angstroms, the ITO film had a thickness of 1,250 angstroms, and the overcoat layer had a thickness of 800 angstroms. Next, Polyglass™ hard polymeric coating (serving as the dielectric layer 500, thickness of 10 microns) was deposited onto the ITO-based coating by doctor blade coating. Then, Wacker 613 SilGel™ material (serving as the elastomer layer 300, thickness of 10 microns) was deposited onto the dielectric layer via doctor blade coating. Finally, a carbon nanotube top electrode (serving as the second transparent electrode 400, having about 0.5-2 mg of CNTs per square foot) was deposited onto the elastomer layer by spray deposition. In the present example, the activation voltage was 350 Volts, and the recovery voltage was 50 Volts.

While some preferred embodiments of the invention have been described, it is to be understood that various changes, adaptations and modifications can be made therein without departing from the spirit of the invention and the scope of the appended claims.

What is claimed is:

1. An elastomeric optical device, the elastomeric optical device having a first optical state and a second optical state, the elastomeric optical device being transparent when in the first optical state and being translucent or opaque when in the second optical state, the elastomeric optical device comprising, in sequence, a first transparent electrode, a dielectric layer, an elastomer layer, and a second transparent electrode, the dielectric layer having a greater stiffness than the elastomer layer, the elastomer layer having a Shore OOO hardness of less than 15 and an elastic modulus that is lower than 20 kPa, the second transparent electrode configured to compress the elastomer layer in response to an electric field between the first and second transparent electrodes, such that when the elastomeric optical device is in the second optical state the elastomer layer is compressed between the first and second transparent electrodes.

2. The elastomeric optical device of claim 1 wherein the dielectric layer has an elastic modulus, and a ratio of the elastic modulus of the dielectric layer to the elastic modulus of the elastomer layer is at least 5,000:1.

3. The elastomeric optical device of claim 2 wherein the ratio of the elastic modulus of the dielectric layer to the elastic modulus of the elastomer layer is at least 100,000:1.

4. The elastomeric optical device of claim 1 wherein the elastomer layer has a yield strength of less than 10 kPa.

5. The elastomeric optical device of claim 4 wherein the yield strength is less than 5 kPa.

6. The elastomeric optical device of claim 1 wherein the elastomer layer is formed of material having a dielectric constant in a range of from 2.5 to 3.2.

7. The elastomeric optical device of claim 1 wherein the elastomer layer comprises a silicone gel characterized by being substantially devoid of unreacted sites.

8. The elastomeric optical device of claim 1 wherein the elastomer layer and the dielectric layer each have a thickness in a range of from 1 to 10 microns.

9. The elastomeric optical device of claim 8 wherein the first and second transparent electrodes have a potential difference between them, the potential difference being in a range of from 40 to 350 Volts.

10. The elastomeric optical device of claim 8 wherein the dielectric layer has a thickness, the elastomer layer has a thickness, and a ratio of the thickness of the elastomer layer to the thickness of the dielectric layer is in a range of from 1 to 3.3.

11. The elastomeric optical device of claim 1 wherein at least certain portions of the second transparent electrode are closer to the first transparent electrode when the elastomeric optical device is in the second optical state than they are when the elastomeric optical device is in the first optical state, the elastomeric optical device having a surface topography that is characterized by greater roughness when the elastomeric optical device is in the second optical state than when it is in the first optical state.

12. The elastomeric optical device of claim 11 wherein the surface topography of the elastomeric optical device when in the second optical state is characterized by pits, wrinkles, or both.

13. The elastomeric optical device of claim 12 wherein the surface topography of the elastomeric optical device when in the second optical state includes more than 100,000 pits/cm$^2$.

14. The elastomeric optical device of claim 1 wherein the elastomer layer and the dielectric layer together provide a desired level of electrical conductivity between the first transparent electrode and the second transparent electrode, the desired level of electrical conductivity being in a range of from $10^{-15}$ to $10^{-7}$ S/cm.

15. The elastomeric optical device of claim 1 wherein the first transparent electrode is a cathode and the second transparent electrode is an anode.

16. The elastomeric optical device of claim 15 wherein the first transparent electrode comprises a transparent conductive oxide film.

17. The elastomeric optical device of claim 16 wherein the transparent conductive oxide film comprises indium tin oxide.

18. The elastomeric optical device of claim 1 wherein the dielectric layer has a dielectric strength of 160 V/micron or higher.

19. The elastomeric optical device of claim 18 wherein the dielectric layer has a dielectric constant in a range of from 3 to 5, and a Shore A hardness of greater than 65.

20. The elastomeric optical device of claim 1 having a capacitance of less than 200 pF per square inch.

21. The elastomeric optical device of claim 1 further comprising a glass pane, wherein the glass pane supports the first transparent electrode, the dielectric layer, the elastomer layer, and the second transparent electrode.

22. The elastomeric optical device of claim 21 further comprising a polymer substrate, wherein the polymer substrate is mounted to the glass pane and carries the first transparent electrode, the dielectric layer, the elastomer layer, and the second transparent electrode.

23. The elastomeric optical device of claim 21 wherein the glass pane is part of a multi-pane insulating glazing unit having a between-pane space, the elastomeric optical device being exposed to the between-pane space.

24. The elastomeric optical device of claim 23 wherein the multi-pane insulating glazing unit further includes a low-emissivity coating on a #2 surface of the multi-pane insulating glazing unit, and the elastomeric optical device is located further from a #1 surface of the multi-pane insulating glazing unit than is the low-emissivity coating such that solar radiation passing into the multi-pane insulating glazing unit through the #1 surface reaches the low-emissivity coating before reaching the elastomeric optical device, the multi-pane insulating glazing unit being mounted in a position such that the #1 surface is exposed to an outdoor environment.

25. An elastomeric optical device, the elastomeric optical device having a first optical state and a second optical state, the elastomeric optical device being transparent when in the first optical state and being translucent or opaque when in the second optical state, the elastomeric optical device comprising, in sequence, a first transparent electrode, a dielectric layer having an elastic modulus, an elastomer layer having an elastic modulus, and a second transparent electrode, wherein a ratio of the elastic modulus of the dielectric layer to the elastic modulus of the elastomer layer is at least 5,000:1, the elastomer layer and the dielectric layer each having a thickness in a range of from 1 to 10 microns, the second transparent electrode configured to compress the elastomer layer in response to an electric field between the first and second transparent electrodes, such that when the elastomeric optical device is in the second optical state the elastomer layer is compressed between the first and second transparent electrodes, and the elastomeric optical device transitions from the first optical state to the second optical state in response to an activation voltage, the activation voltage being in a range of from 100 to 250 Volts.

26. The elastomeric optical device of claim 25 wherein the ratio of the elastic modulus of the dielectric layer to the elastic modulus of the elastomer layer is at least 100,000:1.

27. The elastomeric optical device of claim 25 wherein elastomer layer has a Shore OOO hardness of less than 15, and the elastic modulus of the elastomer layer is less than 20 kPa.

28. The elastomeric optical device of claim 25 wherein the elastomer layer has a yield strength of less than 10 kPa.

29. The elastomeric optical device of claim 28 wherein the yield strength is less than 5 kPa.

30. The elastomeric optical device of claim 25 wherein the elastomer layer comprises a silicone gel characterized by being substantially devoid of unreacted sites.

31. The elastomeric optical device of claim 25 wherein the elastic modulus of the dielectric layer is greater than 100 MPa.

32. The elastomeric optical device of claim 31 wherein the elastic modulus of the dielectric layer is greater than 1 GPa.

33. The elastomeric optical device of claim 25 wherein the first transparent electrode is a cathode and the second transparent electrode is an anode.

34. The elastomeric optical device of claim 33 wherein the first transparent electrode comprises a transparent conductive oxide film.

35. The elastomeric optical device of claim 34 wherein the transparent conductive oxide film comprises indium tin oxide.

36. The elastomeric optical device of claim 25 wherein the dielectric layer has a thickness, the elastomer layer has a thickness, and a ratio of the thickness of the elastomer layer to the thickness of the dielectric layer is in a range of from 1 to 3.3.

37. The elastomeric optical device of claim 25 wherein at least certain portions of the second transparent electrode are closer to the first transparent electrode when the elastomeric optical device is in the second optical state than they are when the elastomeric optical device is in the first optical state, the elastomeric optical device having a surface topography that is characterized by greater roughness when the elastomeric optical device is in the second optical state than when it is in the first optical state.

38. The elastomeric optical device of claim 37 wherein the surface topography of the elastomeric optical device when in the second optical state is characterized by pits, wrinkles, or both.

39. The elastomeric optical device of claim 38 wherein the surface topography of the elastomeric optical device when in the second optical state has from 100,000 pits/cm$^2$ to 10 million pits/cm$^2$.

40. A method of using an elastomeric optical device, the elastomeric optical device having a first optical state and a second optical state, the elastomeric optical device being transparent when in the first optical state and being translucent or opaque when in the second optical state, the elastomeric optical device comprising, in sequence, a first transparent electrode, a dielectric layer, an elastomer layer, and a second transparent electrode, the method comprising maintaining an electric field between the first and second transparent electrodes by providing an activation voltage across the first and second transparent electrodes and thereafter transitioning to providing a recovery voltage across the first and second transparent electrodes, wherein the second transparent electrode compresses the elastomer layer in response to the activation voltage, such that when the activation voltage is provided the elastomeric optical device is in the second optical state due to the elastomer layer being compressed between the first and second transparent electrodes, and the elastomeric optical device changes from the second optical state to the first optical state in response to said transitioning to the recovery voltage, the activation voltage being in a range of from 40 to 350 Volts, and the recovery voltage being a non-zero voltage that is lower than and has the same polarity as the activation voltage.

41. The method of claim 40 wherein the elastomer layer and the dielectric layer each have a thickness in a range of from 1 to 10 microns.

42. The method of claim 41 wherein a ratio of the thickness of the elastomer layer to the thickness of the dielectric layer is in a range of from 1 to 3.3.

43. The method of claim 42 wherein elastomer layer has a Shore OOO hardness of less than 15 and an elastic modulus of less than 20 kPa.

44. The method of claim 43 wherein the elastomer layer has a yield strength of less than 5 kPa.

45. The elastomeric optical device of claim 44 wherein the elastomer layer comprises a silicone gel characterized by being substantially devoid of unreacted sites.

46. The method of claim 40 wherein the first transparent electrode is operated as a cathode and the second transparent electrode is operated as an anode.

47. The method of claim 46 wherein the first transparent electrode comprises a transparent conductive oxide film.

48. The method of claim 47 wherein the transparent conductive oxide film comprises indium tin oxide.

49. The method of claim 40 wherein at least certain portions of the second transparent electrode are closer to the first transparent electrode when the elastomeric optical device is in the second optical state than they are when the elastomeric optical device is in the first optical state, the elastomeric optical device having a surface topography that is characterized by greater roughness when the elastomeric optical device is in its second optical state than when it is in its first optical state.

50. The method of claim 49 wherein the surface topography of the elastomeric optical device when in its second optical state is characterized by pits, wrinkles, or both.

51. The method of claim 50 wherein the surface topography of the elastomeric optical device when in the second optical state includes more than 100,000 pits/cm$^2$.

* * * * *